(12) United States Patent
Cunningham et al.

(10) Patent No.: US 7,174,386 B2
(45) Date of Patent: Feb. 6, 2007

(54) SYSTEM AND METHOD FOR IMPROVED PERFORMANCE USING TUNABLE TCP/IP ACKNOWLEDGEMENT

(75) Inventors: James Brian Cunningham, Austin, TX (US); Herman Dietrich Dierks, Jr., Round Rock, TX (US); Octavian Florin Herescu, Austin, TX (US); Kiet Hien Lam, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 10/185,697

(22) Filed: Jun. 27, 2002

(65) Prior Publication Data

US 2004/0003106 A1    Jan. 1, 2004

(51) Int. Cl.
   *G06F 15/16*    (2006.01)
(52) U.S. Cl. ............... 709/234; 709/212; 709/213; 709/215; 709/216
(58) Field of Classification Search ............ 709/203, 709/212, 213, 214, 215, 216, 234
See application file for complete search history.

(56) References Cited

U.S. PATENT DOCUMENTS

| | | | |
|---|---|---|---|
| 5,809,239 A * | 9/1998 | Dan et al. ................ 709/203 |
| 6,219,728 B1 * | 4/2001 | Yin ........................... 710/52 |
| 6,230,191 B1 * | 5/2001 | Walker ..................... 709/213 |
| 6,463,068 B1 * | 10/2002 | Lin et al. ................. 370/414 |
| 2002/0150049 A1 * | 10/2002 | Collier et al. ............ 370/236 |
| 2003/0086140 A1 * | 5/2003 | Thomas et al. .......... 359/167 |
| 2003/0117992 A1 * | 6/2003 | Kim et al. ................ 370/349 |
| 2003/0152084 A1 * | 8/2003 | Lee et al. .............. 370/395.21 |

* cited by examiner

*Primary Examiner*—Ario Etienne
*Assistant Examiner*—Barbara Burgess
(74) *Attorney, Agent, or Firm*—Van Leeuwen & Van Leeuwen; Thomas E. Tyson

(57) ABSTRACT

A system and method for tuning TCP/IP acknowledgments is provided. The system and method reduces the number of acknowledgments sent by a TCP/IP receiver by determining whether the connection state with the sender warrants using minimal acknowledgments. If minimal acknowledgments are used, the receiver sends fewer acknowledgments to the sender in response to received packets. The number of packets that are received before an acknowledgment is returned is increased until the delay value reaches a threshold value. The threshold value can be determined based on the size of the buffer setup to receive packets from the sender during the session. If errors, such as TCP/IP timeouts or duplicate packets, are detected, the threshold is changed to the last delay value that did not cause errors. If further errors are detected, the system is programmed to revert to sending traditional acknowledgments for the session.

19 Claims, 7 Drawing Sheets

SYSTEM AND METHOD FOR IMPROVED PERFORMANCE USING TUNABLE TCP/IP ACKNOWLEDGEMENT

BACKGROUND OF THE INVENTION

1. Technical Field

The present invention relates in general to a system and method for tuning the TCP/IP acknowledgment for improved performance. In particular, the present invention relates to a system and method for reducing the number of acknowledgments needed, thus improving throughput and network traffic.

2. Description of the Related Art

The Internet protocols are a popular open-system (non-proprietary) protocol suite that can be used to communicate across any set of interconnected networks and are equally well suited for LAN and WAN communications. The Internet protocols consist of a suite of communication protocols, of which the two best known are the Transmission Control Protocol (TCP) and the Internet Protocol (IP). The Internet protocol suite not only includes lower-layer protocols (such as TCP and IP), but it also specifies common applications such as electronic mail, terminal emulation, and file transfer.

Internet protocols were first developed in the mid-1970s, when the Defense Advanced Research Projects Agency (DARPA) became interested in establishing a packet-switched network that would facilitate communication between dissimilar computer systems at research institutions. With the goal of heterogeneous connectivity in mind, DARPA funded research by Stanford University and Bolt, Beranek, and Newman (BBN). The result of this development effort was the Internet protocol suite, completed in the late 1970s.

The Transmission Control Protocol (TCP) uses acknowledgments sent by receivers to senders when packets arrive. While acknowledgments provide reliability, they increase network traffic and causes additional processing to be performed by the sender and the receiver. These challenges result in lower network throughput than if acknowledgments were significantly reduced. Coupled with this is vast improvement of network reliability since the development of the TCP and IP protocols. This is especially true on closed networks, such as LANs and Intranets, where the network components are maintained and controlled by a common support staff and where the component's are known to be reliable.

Various attempts have addressed reducing TCP acknowledgments with varying success. The slow start algorithm is used to initialize a congestion window size to an initial value, such as one packet, and then increase the congestion window size as acknowledgments are received. While the number of acknowledgments using the slow start algorithm is reduced, acknowledgments are still required on a per packet or group of packets basis. Additionally, the slow start algorithm may actually impact network performance over traditional approaches for short transfers as well as in transfers over long-delay channels, such as networks using satellite links.

In a sliding window algorithm, the sender sends packets (e.g., packets 1, 2, and 3) and sets a timer for each packet. The sender then tracks the timers against the corresponding acknowledgments. If a timeout condition occurs on any one of the packets, that packet is resent. However, delayed acknowledgment protocols have performance impacts and, in some situations, have been found to actually reduce network performance.

What is needed, therefore, is a system and method that does not require acknowledgments from the sender upon the receipt of each packet or group of packets but, instead, uses the client's advertised window size to determine when an acknowledgment is needed. Moreover, what is needed is a system and method used by a receiver to determine whether a particular sender is expecting acknowledgments on a per-packet basis or has implemented a minimal acknowledgment protocol.

SUMMARY

It has been discovered that the aforementioned challenges can be overcome by a system and method that reduces the number of acknowledgments sent by a TCP/IP receiver. The receiver determines whether the connection state with the sender warrants using minimal acknowledgments. If minimal acknowledgments are used, the receiver sends fewer acknowledgments to the sender in response to received packets.

The determination regarding the connection state can either be made manually or automatically. In a manual setting, the user determines, based on the environment, that traffic between the sender and receiver is likely to be reliable. The user then sets each device to use minimal acknowledgments (i.e., the receiver sends fewer acknowledgments and the sender expects to receive fewer acknowledgments).

In an automated setting, the receiver determines whether the sender is configured to handle minimal acknowledgments as well as whether network conditions are favorable for using minimal acknowledgments. In one embodiment using minimal acknowledgments, the receiver increases the delay interval between acknowledgments in a linear fashion. If the sender stops sending additional packets (i.e., a TCP/IP timeout condition occurs) or duplicate packets are received, the receiver notes the errors and determines whether traditional acknowledgment processing should be used because either (1) network conditions are not favorable for minimal acknowledgments, or (2) the sender is not configured to respond properly to a receiver using minimal acknowledgments. If too many errors occur, the receiver reduces the delay interval by which it sends acknowledgments or stops using the minimal acknowledgment technology altogether.

In one embodiment, when an error, such as a TCP/IP timeout or reception of a duplicate packet, occurs, the threshold value is set to the last delay value that was used without causing errors. In this manner, the threshold value is automatically reduced to the largest value that did not induce errors in the session.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
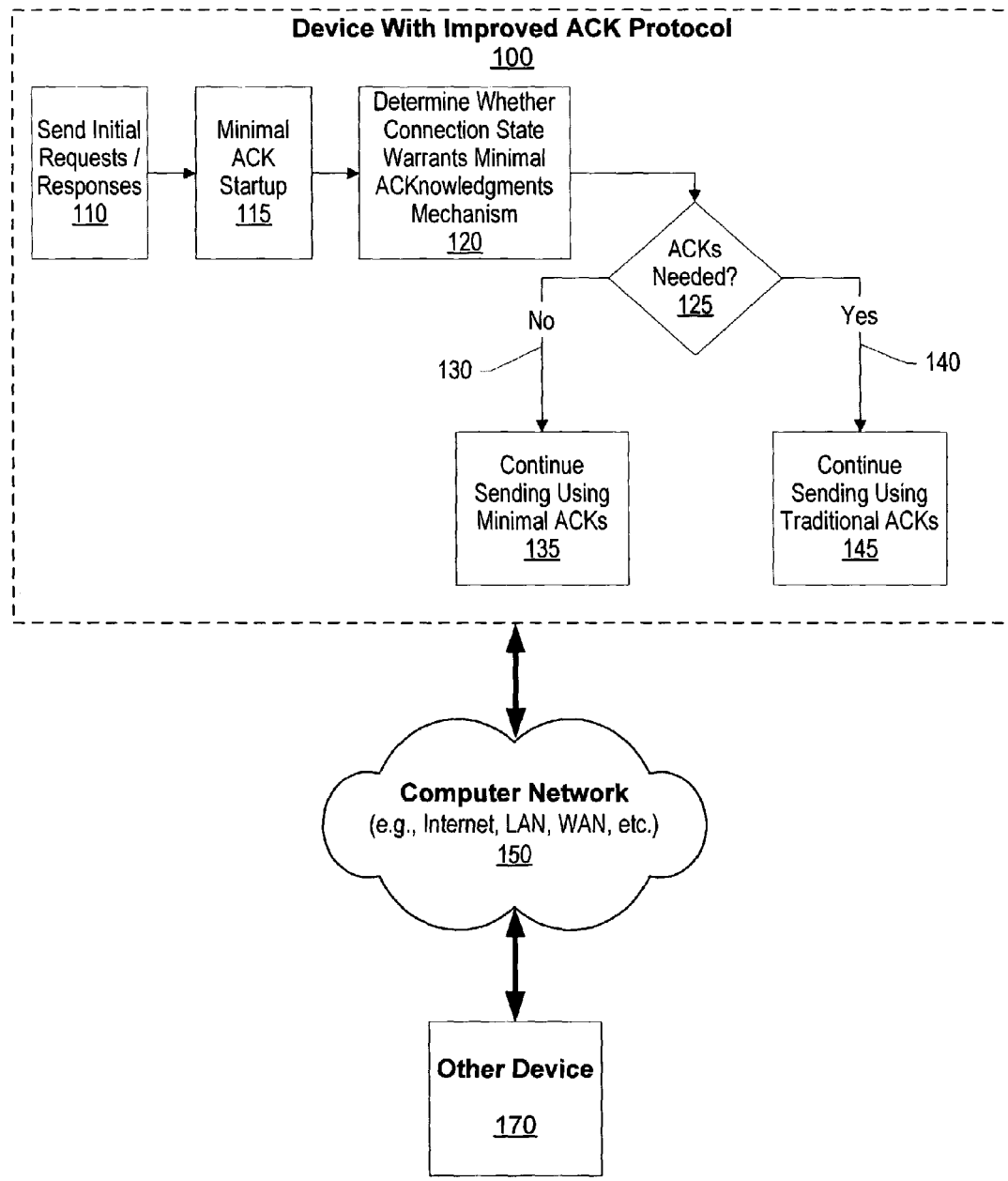
FIG. 1 is a system diagram of a device using an improved acknowledgment protocol with another network device.

FIG. 1 is a system diagram of a device using an improved acknowledgment protocol with another network device. A network device using an improved acknowledgment protocol (100) sends initial requests and responses to another device (170) using computer network 150. Computer network 150 includes a variety of networks used to connect computer systems, such as the Internet, a local area network (LAN), a wide area network (WAN), and the public switched telephone network (PSTN). Initial requests include a connection request (SYN request), and packets used to establish the connection, such as acknowledgments (SYN/ACK, and ACK) as well as one or more request packets (REQ).

Device 100 initializes its minimal ACK protocol (step 115). Initialization step 115 includes initializing the threshold value that will be used to determine when acknowledgments are sent to other device 170. In addition, device 100 determines whether it will use a startup delay interval and, if so, how the delay interval will be increased until it is the same as the threshold value.

Device 100 receives response packets (RESP) from other device 170. Based upon the received packets, device 100 determines whether the connection state with the other device warrants the continued use of the minimal acknowledgments mechanism (step 120). This determination is made based on whether TCP/IP timeouts are occurring and whether other device 170 is sending duplicate packets (i.e., the other device assumes a network problem is occurring because it is not receiving traditional acknowledgments).

Device 100 determines whether the connection state necessitates use of traditional acknowledgments (decision 125). If the connection state does not necessitate use of traditional acknowledgments, decision 125 branches to "no" branch 135 whereupon the device continues using the minimal acknowledgments mechanism (step 135). On the other hand, if the connection state does warrant use of traditional acknowledgments, decision 125 branches to "yes" branch 140 whereupon device 100 sends acknowledgments to other device 170 in a traditional manner as described in the background of the invention.

Figure 2:
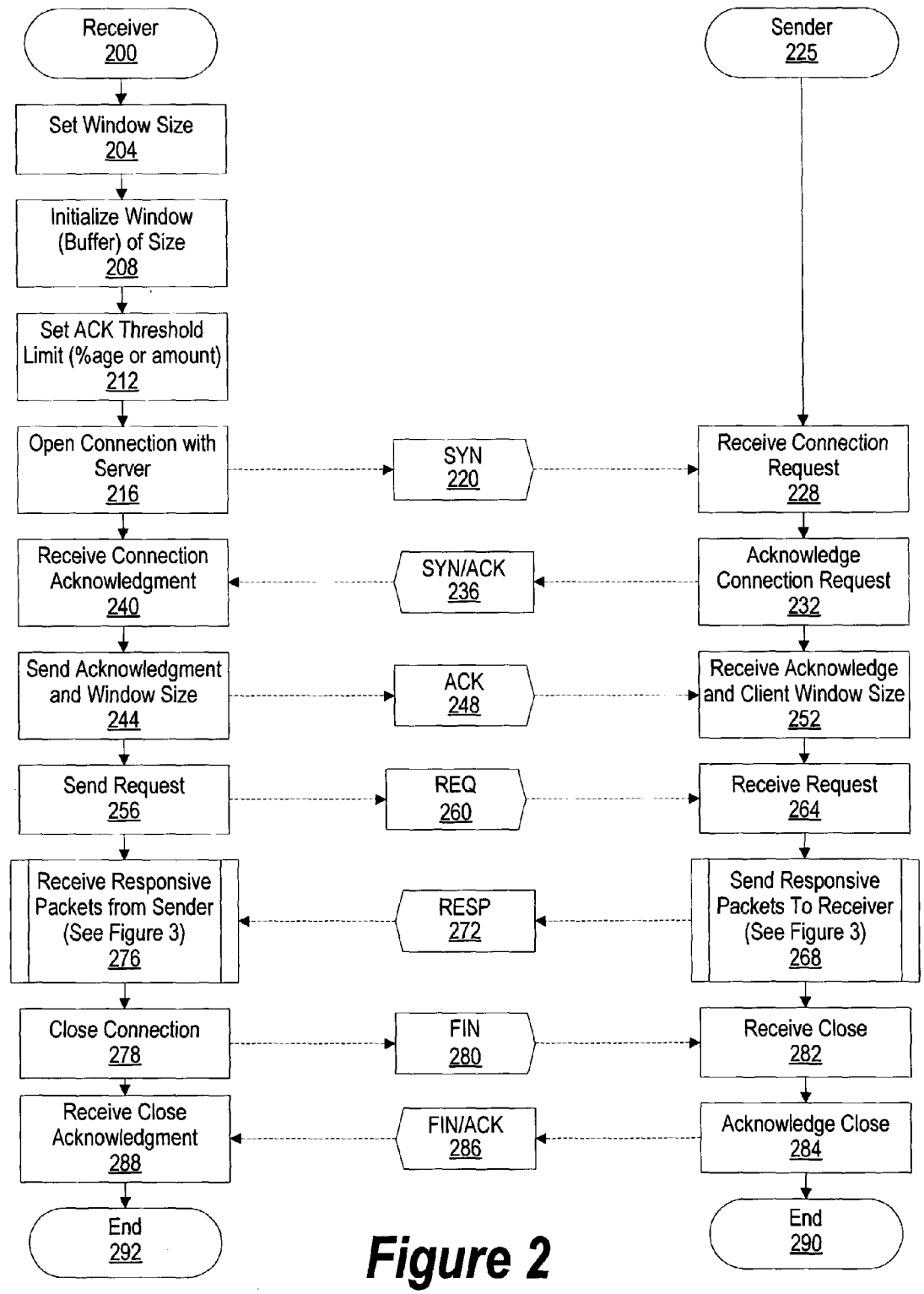
FIG. 2 is a high level flowchart showing messages sent between a sender and a receiver using an improved acknowledgment protocol.

FIG. 2 is a high level flowchart showing messages sent between a sender and a receiver using an improved acknowledgment protocol. Receiver 200 commences processing by setting its window size (step 204). The "window" is a buffer that is allocated to store data received from the sender. The receiver initializes the window (i.e., the buffer) using the set window size (step 208). For example, receiver 200 may allocate a 16 KB window (buffer) for a particular TCP/IP session.

An acknowledgment threshold limit is set (step 212). The threshold limit determines the point at which an acknowledgment is returned to the sender. The threshold may be a percentage of the window size (e.g., 50% of a 32K window size would set the threshold at 16K). Likewise, the threshold can be a specific amount (e.g., 16K).

Receiver 200 opens a connection with the server (step 216) by sending a SYN packet to sender 225. Sender 225, such as a server or a client that is using the connection to send data to network accessible storage that is managed by the receiver, receives the connection request (step 228). The sender acknowledges the connection request (step 232) by sending an acknowledgment packet (SYN/ACK packet 236) back to receiver 200. The receiver receives the connection acknowledgment (step 240) and responds by sending an acknowledgment (ACK packet 248) that includes the receiver's window size (step 244). The window size was previously initialized in step 204.

Sender 225 receives the receiver's acknowledgment along with the receiver's window size (step 252). The receiver sends a request (step 256) by sending request packet (REQ packet 260) to sender 225. Sender 225 receives the request (step 264) and responds by sending responsive packets (RESP packets 272) back to the receiver (predefined process 268, see FIG. 3 for processing details). The receiver, in turn, receives the responsive packets from the sender and determines when to send additional acknowledgments (predefined process 276, see FIG. 3 for processing details).

When the receiver is finished receiving packets from the sender, the receiver closes the connection (step 278) by sending FIN packet 280 to the sender. Sender 225 receives the close connection request (step 282). The sender responds by acknowledging the close request (step 284) by sending FIN/ACK packet 286 to the receiver. The receiver receives the close acknowledgment from the sender at step 288. Sender and receiver processing thereafter ends at 290 and 292, respectively.

Figure 3:
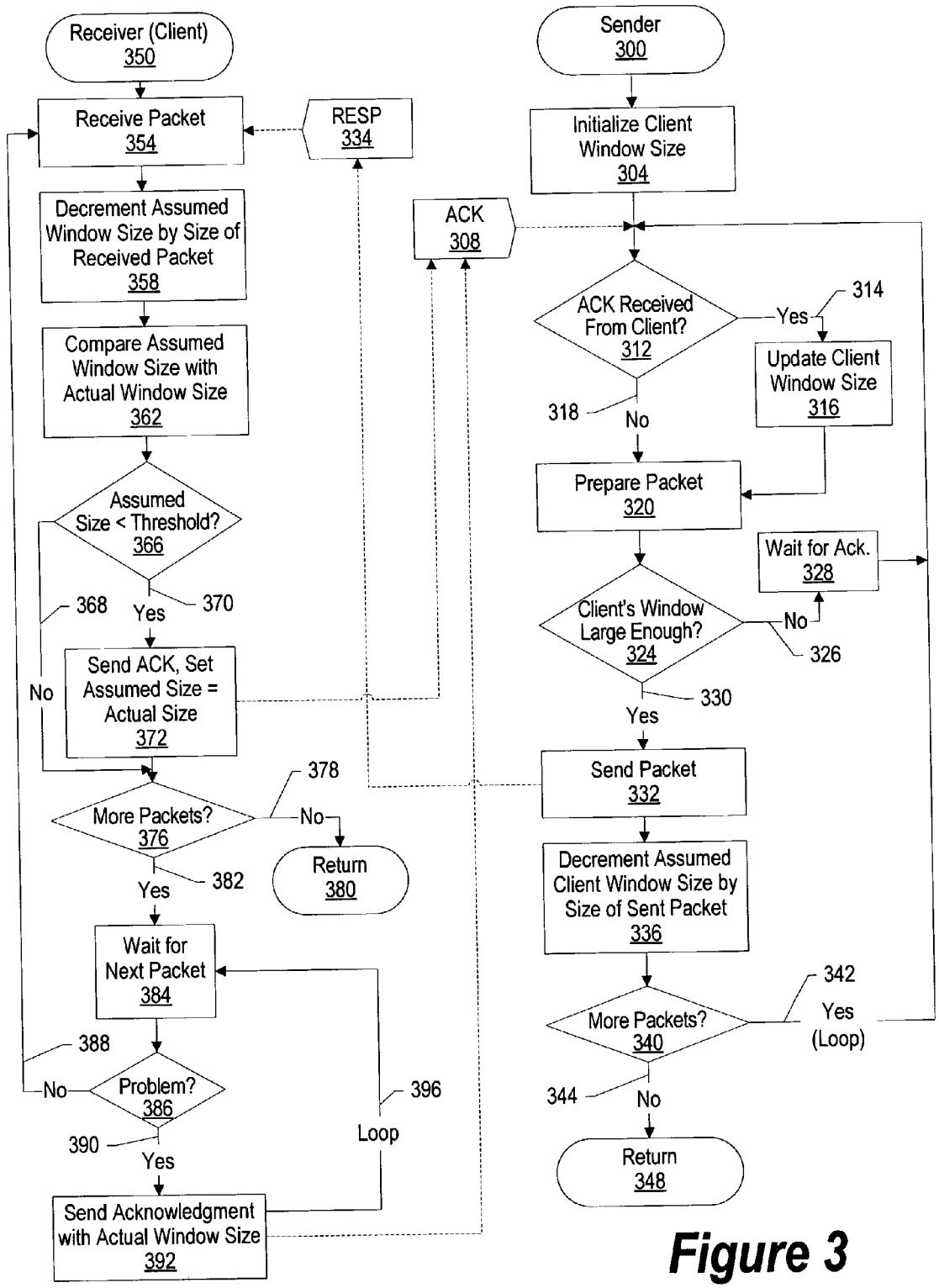
FIG. 3 is a flowchart showing processing steps taken by a sender and a receiver using an improved acknowledgment protocol.

FIG. 3 is a flowchart showing processing steps taken by a sender and a receiver using an improved acknowledgment protocol. In one embodiment of FIG. 3, the sender and receiver are each set to use fewer acknowledgments. Such an embodiment may be configured by information technology staff where the sender and receiver are on a common local area network (LAN) or Intranet.

Sender processing commences at 300 whereupon the sender initializes the client's (i.e., receiver's) window size (step 304). A determination is made as to whether an acknowledgment (with a revised actual window size) has been received from the client (decision 312). If an acknowledgment has been received, decision 312 branches to "yes" branch 314 whereupon the sender updates the client's window size (step 316). On the other hand, if an acknowledgment has not been received, decision 312 branches to "no" branch 318 and the client's window size is not updated.

Until the client sends an acknowledgment with its actual window size, the sender keeps track of what the client's window size should be based upon the size of the packets that the sender has sent. The sender does not know many packets have been processed and removed from the client's window. Consequently, the sender relies on an "assumed" client window size until the client sends an acknowledgment updating the window size data.

The sender prepares a packet to send to the client (step 320). A determination is made as to whether the client's window size (the size the sender is aware of, not the actual window size as explained above) is large enough to receive the prepared packet (decision 324). If the client's window size is not large enough, decision 324 branches to "no" branch 326 whereupon the sender does not send the packet but instead waits for an acknowledgment from the client (step 328). When the acknowledgment is received, processing loops back and the client's window size is updated in step 316.

On the other hand, if the client's window size is large enough, decision 324 branches to "yes" branch 330 whereupon the packet (RESP packet 334) is sent to the client at step 332. The sender then decrements the client's "assumed" window size by the size of the packet that was sent (step 336). A determination is made as to whether there are more packets to send (decision 340). If there are more packets to send, decision 340 braches to "yes" branch 342 which loops back to send the next packet. On the other hand, if there are no more packets to send, decision 340 branches to "no" branch 344 whereupon processing returns at 348 (see FIG. 2 for subsequent processing steps).

Client (i.e., receiver) processing commences at 350 whereupon packet 334 sent by the sender is received (step 354). The client decrements the "assumed" window size (i.e., the window space that the sender assumes the client has remaining) by the size of the received packet (step 358). The assumed window size is compared to the actual window size (step 362).

A determination is made as to whether the assumed window size is less than the threshold limit (decision 366, see FIG. 2, step 212 for discussion regarding the threshold limit). If the assumed window size is less than the threshold limit, decision 366 branches to "yes" branch whereupon the client sends an acknowledgment (ACK packet 308) to the sender to update the client's actual window size and the assumed window size is set to the actual window size (step 372). On the other hand, if the assumed window size is not less than the threshold limit, decision 366 branches to "no" branch 368 bypassing step 372.

A determination is made as to whether there are more packets to receive (decision 376). If there are no more packets, decision 376 branches to "no" branch 378 whereupon processing returns at 380 (see FIG. 2 for subsequent processing).

On the other hand, if there are more packets, decision 376 branches to "yes" branch 382 to wait for the next packet (step 384). A determination is made as to whether there is a problem in receiving the next packet (decision 386). If the next packet arrives, decision 386 branches to "no" branch and processing loops back to receive the packet and determine whether an acknowledgment should be sent to the sender. On the other hand, if there is a problem, such as a timeout condition or the receipt of a duplicate packet, decision 386 branches to "yes" branch 390 whereupon an acknowledgment is sent to the sender with the receiver's actual window size and the assumed window size is set to the actual window size (step 392). Processing loops back (loop 396) to wait for the next packet to arrive and handle any error that occurs. The receiver continues receiving packets until there are no more packets to receive, at which point decision 376 branches to "no" branch 378 and processing returns at 380.

Figure 4:
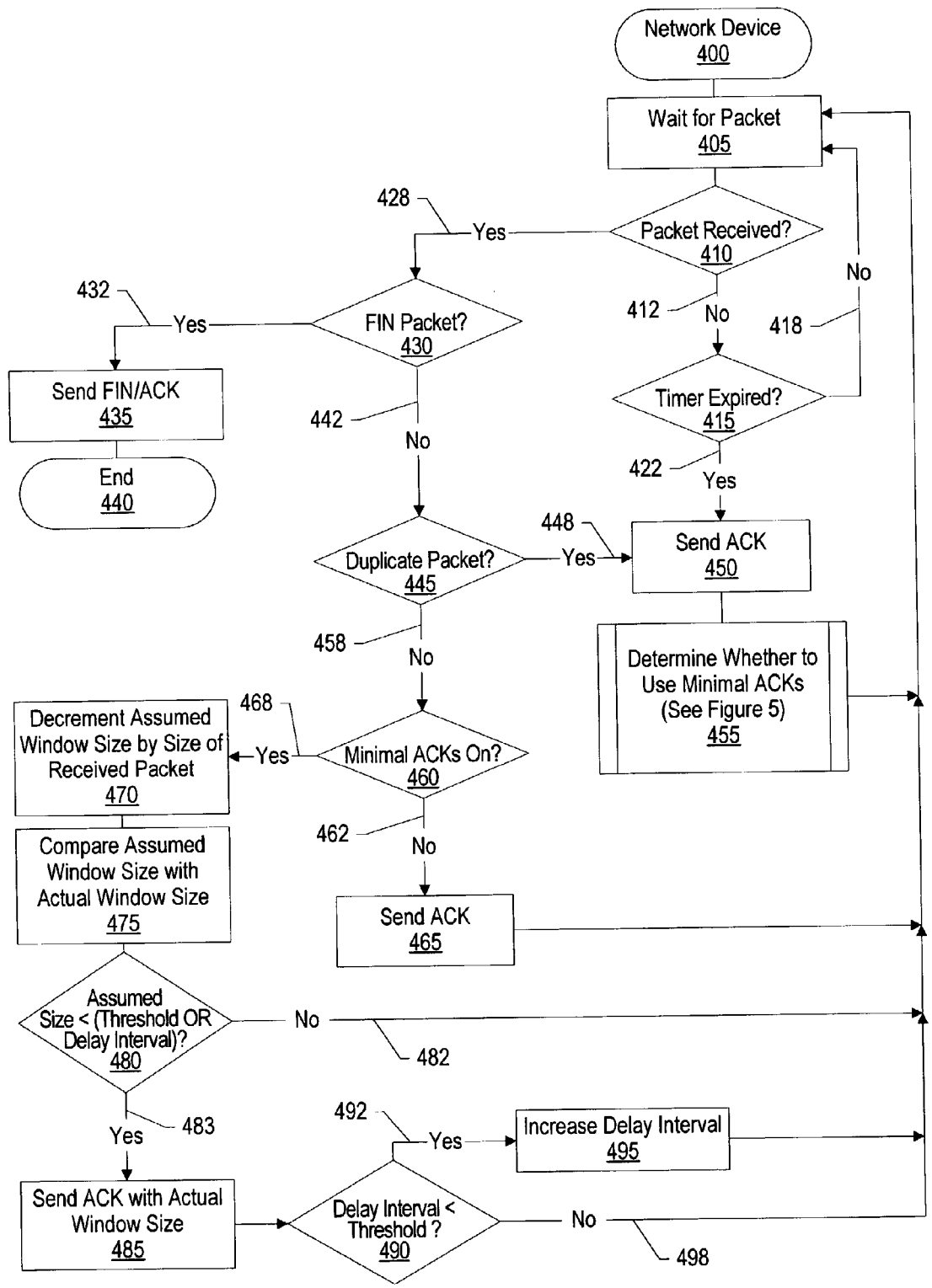
FIG. 4 is a flowchart showing a network device using an improved acknowledgment protocol receiving packets from another network device.

FIG. 4 is a flowchart showing a network device using an improved acknowledgment protocol receiving packets from another network device. In one embodiment of FIG. 4, the network device is on a common network, such as a WAN or the Internet, where it is not known whether the other device is using the minimal acknowledgment protocol described herein. Processing performed by FIGS. 4 and 5 determine whether the minimal acknowledgment protocol can be used when communicating with another device on the network.

FIG. 4 processing commences at 400 whereupon the network device waits for a packet (step 405). A determination is made as to whether a packet is received (decision 410). If a packet is not received, decision 410 branches to "no" branch 412 whereupon another determination is made as to whether a TCP/IP timeout condition has occurred (decision 415). If a timeout condition has not occurred, decision 415 branches to "no" branch 418 which loops back to wait for the next packet. On the other hand, if a TCP/IP timeout condition has occurred decision 415 branches to "yes" branch 422 whereupon an acknowledgment is sent to the other device with the sending device's actual window size (step 450), and a determination is made as to whether to continue using minimal acknowledgments for this session (predefined process 455, see FIG. 5 for processing details) and processing loops back to wait for the next packet.

Returning to decision 410, if a packet is received, decision 410 branches to "yes" branch 428 to process the packet. A determination is made as to whether the packet is a FIN packet indicating that the other device is closing the connection (decision 430). If the packet is a FIN packet, decision 430 branches to "yes" branch 432 whereupon a FIN/ACK packet is sent acknowledging the connection termination (step 435) and processing ends at 440.

On the other hand, if the packet is not a FIN packet, decision 430 branches to "no" branch 442 whereupon a determination is made as to whether the received packet is a duplicate packet (decision 445). Receipt of a duplicate packet may indicate that the other device is waiting for an acknowledgment and has sent the duplicate packet in order to correct a perceived network error. If the packet is a duplicate packet, decision 445 branches to "yes" branch 448 whereupon an acknowledgment is sent to the other device with the sending device's actual window size (step 450), and a determination is made as to whether to continue using minimal acknowledgments for this session (predefined process 455, see FIG. 5 for processing details) and processing loops back to wait for the next packet.

If the packet is not a FIN packet and the packet is not a duplicate packet, then decision 445 branches to "no" branch 458 whereupon a determination is made as to whether the network device is using the minimal acknowledgment protocol for the session with the other device (decision 460). If the minimal acknowledgment protocol is not being used for the session, decision 460 branches to "no" branch 462 and an acknowledgment is sent to the other device (step 465) acknowledging the receipt of the packet and processing loops back to wait for the next packet.

On the other hand, if the minimal acknowledgment protocol is being used, decision 460 branches to "yes" branch 468 whereupon the network device decrements the "assumed" window size (i.e., the window space that the sender assumes the client has remaining) by the size of the received packet (step 470). The assumed window size is compared to the actual window size (step 475). A determination is made as to whether the assumed window size is less than the threshold limit (decision 480, see FIG. 2, step 212 for discussion regarding the threshold limit) or whether the assumed window size is less than a delay interval (decision 480). A delay interval is used in some embodiments to gradually increase the number of packets that are received before an acknowledgment is returned until the delay interval is greater than or equal to the threshold limit (at which point the threshold limit is used for the determination).

If the assumed window size is not less than either the threshold limit or the delay interval then decision 480 branches to "no" branch 482 whereupon processing loops back to wait for the next packet.

On the other hand, if the assumed window size is less than either the threshold limit or the delay interval then decision 480 branches to "yes" branch 483 whereupon an acknowledgment is sent to the other device with the network devices actual window size and the assumed window size is set to the actual window size (step 485). A decision is made as to whether the delay interval is less than the threshold limit (decision 490). If the delay interval is less than the threshold limit then decision 490 branches to "yes" branch 492 whereupon the delay interval value is increased by a predetermined size (step 495) and processing loops back to wait for the next packet. This will continue for subsequent packets until the delay interval is greater than or equal to the threshold limit, at which point decision 490 branches to "no" branch 498 which bypasses step 495 and loops back to wait for the next packet. Packet processing continues until the connection is closed, at which point decision 430 branches to "yes" branch 432 and subsequently ends at 440.

Figure 5:
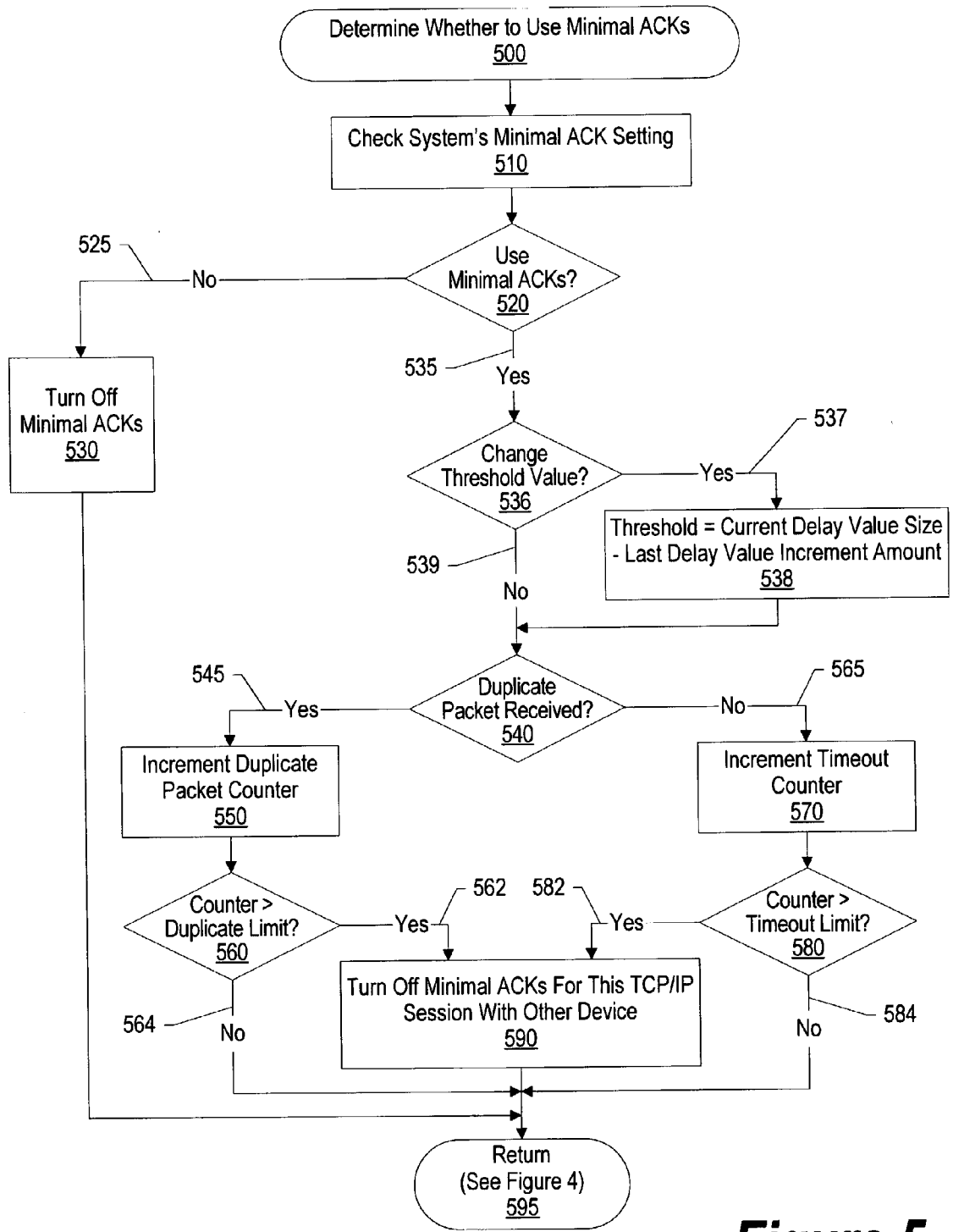
FIG. 5 is a flowchart showing the network device determining whether to continue using the improved acknowledgment protocol based upon packets received from the other network device.

FIG. 5 is a flowchart showing the network device determining whether to continue using the improved acknowledgment protocol based upon packets received from the other network device. Processing commences at 500 whereupon a check is made to determine whether the minimal acknowledgment protocol is used for the current TCP/IP session (step 510). A determination is made as to whether the system is using the minimal acknowledgment protocol (decision 520). If the system is not using the minimal acknowledgment protocol, decision 520 branches to "no" branch 525 whereupon the system does not use the minimal acknowledgment protocol (step 530).

On the other hand, if the minimal acknowledgment protocol is being used for the current session, decision 520 branches to "yes" branch 535 to ultimately determine if the minimal acknowledgment protocol should continue to be used for the current session.

A determination is made as to whether the threshold size should be changed in response to the error condition (decision 536). The current delay value size is incremented until it reaches a threshold value size (see FIG. 4, steps 490 and 495). The error condition may signal that a maximum window size maintained by the sender has been exceeded. Therefore, the threshold size can be changed to the highest delay value used for the session that did not cause an error. If the threshold value size is changed, decision 536 branches to "yes" branch 537 whereupon the threshold is set to be equal to the current delay value size minus the amount the delay value was last incremented (step 538). The reason for subtracting the last delay value increment amount is because the current delay value caused an error to occur so subtracting the increment amount provides the last delay value size that did not cause an error condition. In some embodiments, the threshold amount may remain constant (i.e., not changed in response to an error). In these embodiments, the threshold value is not changed and decision 536 branches to "no" branch 539.

A determination is made as to whether the last received packet was a duplicate packet (decision 540). If the packet was a duplicate packet, decision 540 branches to "yes" branch 545 whereupon a duplicate packet counter is incremented (step 550). A determination is made as to whether the duplicate packet counter is greater than a duplicate packet limit for the session (decision 560). If the counter is greater than the limit, decision 560 branches to "yes" branch 562 whereupon the system stops using the minimal acknowledgment protocol for the current session (step 590) and processing returns at 595. On the other hand, if the counter is not greater than the limit, decision 560 branches to "no" branch 564 which bypasses step 590 and returns at 595 (see FIG. 4 for subsequent processing steps).

Returning to decision 540, if the last packet was not a duplicate packet (i.e., indicating that a TCP/IP timeout condition occurred), then decision 540 branches to "no" branch 565 whereupon a timeout counter is incremented (step 570). A determination is made as to whether the timeout counter is greater than a timeout limit for the session (decision 580). If the counter is greater than the limit, decision 568 branches to "yes" branch 582 whereupon the system stops using the minimal acknowledgment protocol for the current session (step 590) and processing returns at 595. On the other hand, if the counter is not greater than the limit, decision 580 branches to "no" branch 584 which bypasses step 590 and returns at 595 (see FIG. 4 for subsequent processing steps).

Figure 6:
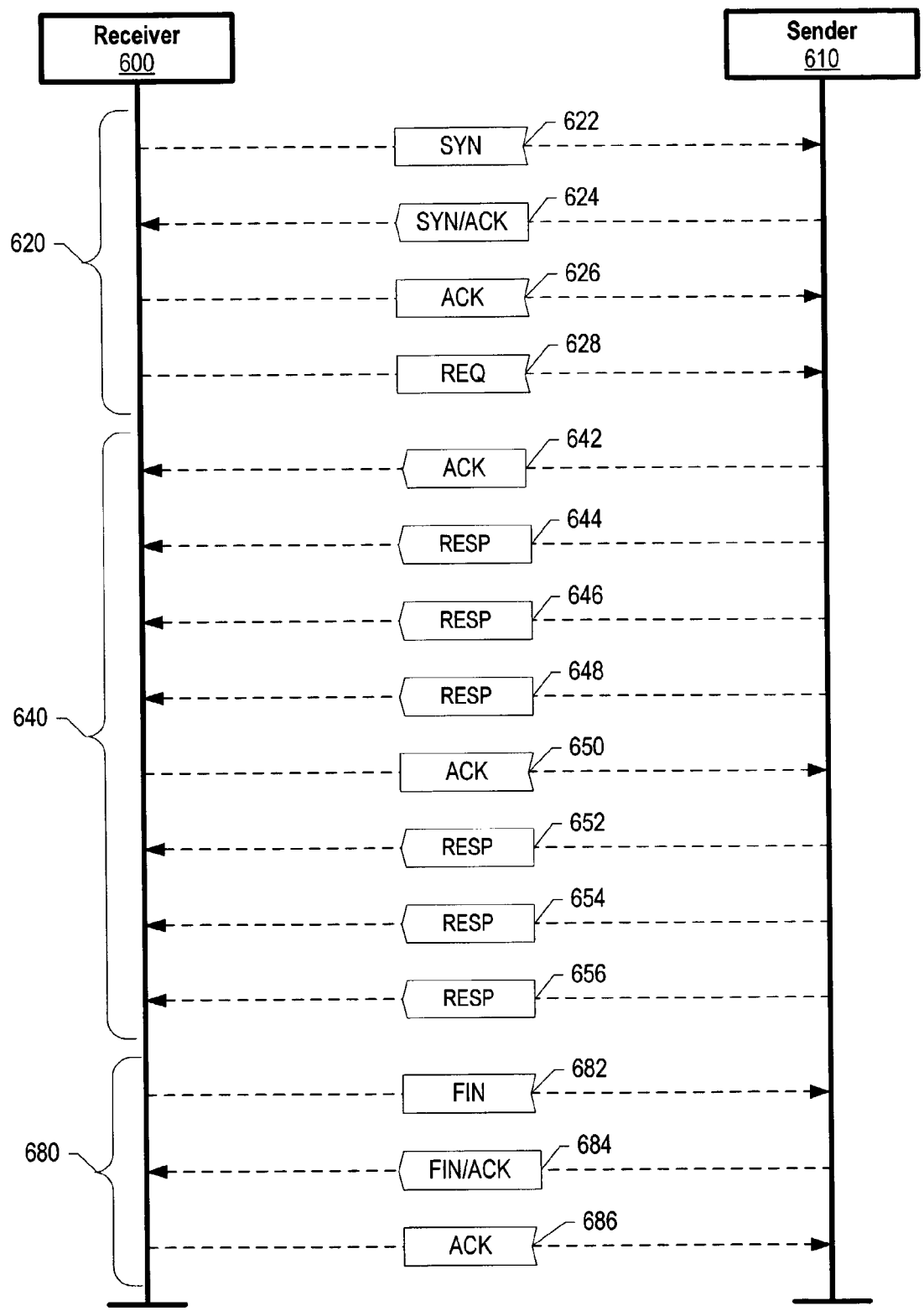
FIG. 6 is a message diagram showing packet traffic between devices using minimal acknowledgments.

FIG. 6 is a message diagram showing packet traffic between devices using minimal acknowledgments. Handshaking steps 620 are used to establish a session between receiver 600 and sender 610. During the handshaking steps, receiver 600 initiates a session with sender 610 by sending SYN packet 622. Sender 610 responds by sending an acknowledgment (SYN/ACK 624). Receiver 600 acknowledges the sender and provides the receiver's window size in ACK packet 626. Receiver 600 sends request (REQ 628) to sender 610.

Data delivery steps 640 are used to transmit data from the sender to the receiver using minimal acknowledgments after the session has been established. Sender 610 acknowledges the receiver's request with ACK packet 642. Sender 610 then sends multiple data packets (644, 646, and 648). When the receiver's threshold limit or delay interval is reached the receiver sends an acknowledgment back to the sender (ACK packet 650) informing the sender of the actual amount of space remaining in the receiver's window (i.e., buffer) used to store packets received from the sender. Sender 610 continues sending multiple packets (i.e., packets 652, 654, and 656) without receiving intervening acknowledgments from the receiver.

Connection closing steps 680 are used to close the connection between the receiver and the sender when the sender is finished sending response packets. Receiver 600 sends FIN packet 682 to sender 610 requesting termination of the session. Sender 610 responds by acknowledging the session termination request with FIN/ACK packet 684. Receiver 600 acknowledges the sender's FIN/ACK packet with acknowledgment 686 and the session is closed.

Figure 7:
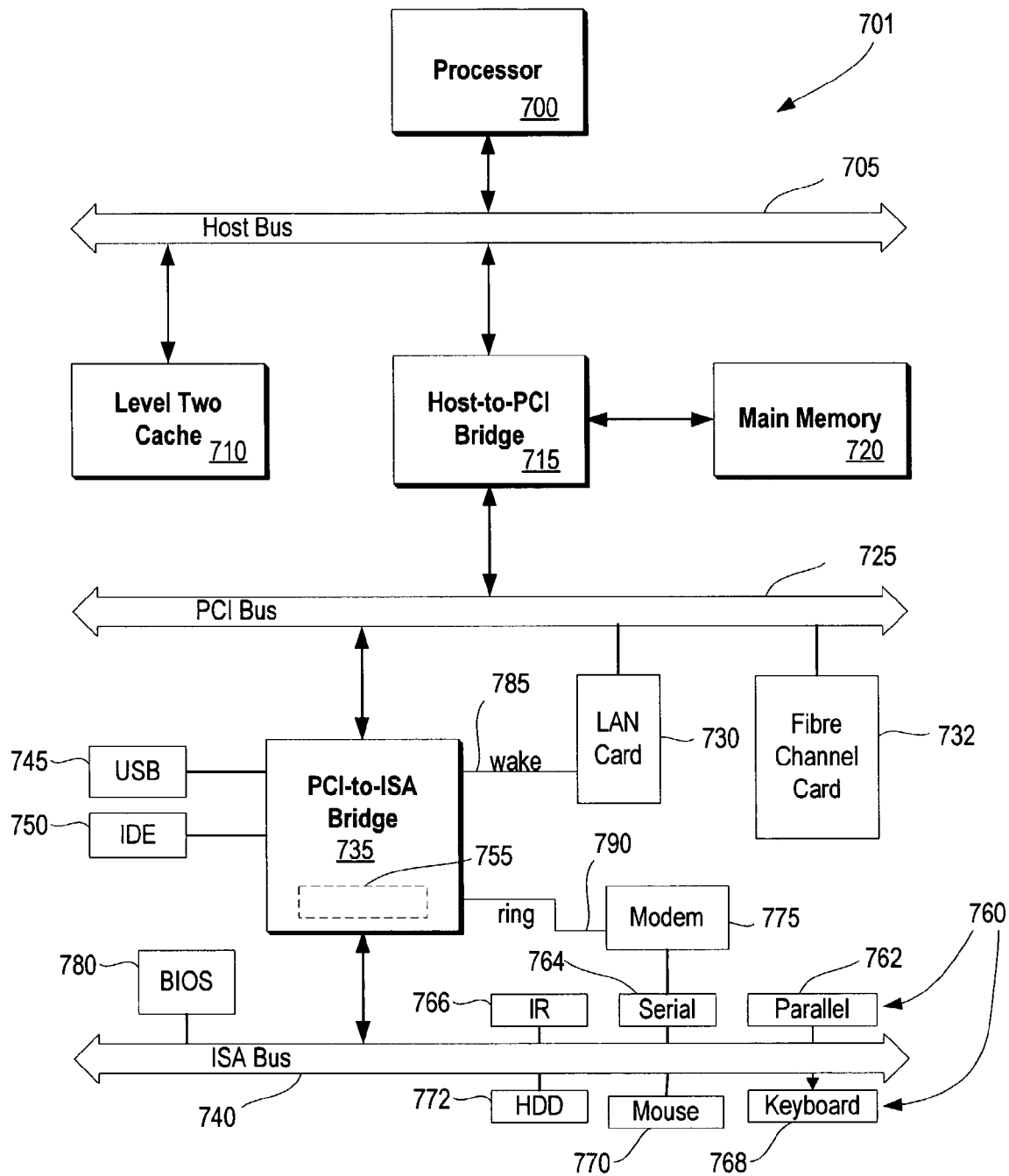
FIG. 7 is a block diagram of an information handling system capable of implementing the present invention.

FIG. 7 illustrates information handling system 701 which is a simplified example of a computer system capable of performing the operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, fixed disk (HDD) 772 coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, and read only memory, In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for improving computer network throughput, said method comprising:
    initializing a buffer size in a memory area;
    receiving a plurality of packets from a sender over a computer network, each of the packets having a packet size;
    storing the packets in a buffer;
    removing one or more of the packets from the buffer;
    calculating an assumed available buffer size and an actual available buffer size, wherein the assumed available buffer size is calculated by subtracting the packet sizes of the stored packets from the buffer size, and the actual available buffer size is calculated by adding the packet sizes of the removed packets to the assumed available buffer space; and
    sending an acknowledgment to the sender in response to the assumed available buffer size falling below a limit, the acknowledgment including the actual available buffer size.

2. The method as described in claim 1 wherein the limit is selected from a group consisting of a threshold amount and a delay interval amount.

3. The method as described in claim 1 further comprising:
    detecting an error in the receiving; and
    reducing the limit in response to the detection.

4. The method as described in claim 3 wherein the error is selected from the group consisting of a TCP/IP timeout condition and a receipt of a duplicate packet.

5. The method as described in claim 1 further comprising:
    setting a threshold value; and
    calculating a plurality of delay interval values, wherein the last interval value is greater than the second-to-last interval value, and wherein the limit is the lesser of the threshold value and the last interval value.

6. The method as described in claim 5 further comprising:
    detecting an error in the receiving; and
    setting the threshold value equal to the second-to-last interval value in response to the detection.

7. An information handling system comprising:
    one or more processors;
    a memory area accessible by the processors;
    a network interface connecting the information handling system to a computer network; and
    a packet receiving tool for receiving packets from a sender over the computer network, the packet receiving tool including:
        means for initializing a buffer in the memory area with a buffer size;
        means for receiving a plurality of packets from the sender, each of the packets having a packet size;
        means for storing the packets in the buffer;

means for removing one or more of the packets from the buffer;

means for calculating an assumed available buffer size and an actual available buffer size, wherein both the assumed and actual available buffer sizes correspond to the buffer, and wherein the assumed available buffer size is calculated by subtracting the packet sizes of the stored packets from the buffer size, and the actual available buffer size is calculated by adding the packet sizes of the removed packets to the assumed available buffer space; and means for sending an acknowledgment to the sender in response to the assumed available buffer size falling below a limit, the acknowledgment including the actual available buffer size.

8. The information handling system as described in claim 7 wherein the limit is selected from a group consisting of a threshold amount and a delay interval amount.

9. The information handling system as described in claim 7 further comprising:

means for detecting an error in the receiving; and means for reducing the limit in response to the detection.

10. The information handling system as described in claim 9 wherein the error is selected from the group consisting of a TCP/IP timeout condition and a receipt of a duplicate packet.

11. The information handling system as described in claim 7 further comprising:

means for setting a threshold value; and means for calculating a plurality of delay interval values, wherein the last interval value is greater than the second-to-last interval value, and wherein the limit is the lesser of the threshold value and the last interval value.

12. The information handling system as described in claim 11 further comprising:

means for detecting an error in the receiving; and means for setting the threshold value equal to the second-to-last interval value in response to the detection.

13. A computer program product stored in a computer readable media for improving computer network throughput, said computer program product comprising:

means for initializing a buffer in a memory area with a buffer size;

means for receiving a plurality of packets from a sender over a computer network, each of the packets having a packet size;

means for storing the packets in the buffer;

means for removing one or more of the packets from the buffer;

means for calculating an assumed available buffer size and an actual available buffer size, wherein both the assumed and actual available buffer sizes correspond to the buffer, and wherein the assumed available buffer size is calculated by subtracting the packet sizes of the stored packets from the buffer size, and the actual available buffer size is calculated by adding the packet sizes of the removed packets to the assumed available buffer space; and means for sending an acknowledgment to the sender in response to the assumed available buffer size falling below a limit, the acknowledgment including the actual available buffer size.

14. The computer program product as described in claim 13 wherein the limit is selected from a group consisting of a threshold amount and a delay interval amount.

15. The computer program product as described in claim 13 further comprising:

means for detecting an error in the receiving; and means for reducing the limit in response to the detection.

16. The computer program product as described in claim 15 wherein the error is selected from the group consisting of a TCP/IP timeout condition and a receipt of a duplicate packet.

17. The computer program product as described in claim 13 further comprising:

means for setting a threshold value; and means for calculating a plurality of delay interval values, wherein the last interval value is greater than the second-to-last interval value, and wherein the limit is the lesser of the threshold value and the last interval value.

18. The computer program product as described in claim 17 further comprising:

means for detecting an error in the receiving; and means for setting the threshold value equal to the second-to-last interval value in response to the detection.

19. A method for improving computer network throughput, said method comprising:

initializing a buffer in a memory area with a buffer size;

receiving a plurality of packets from a sender over a computer network, each of the packets having a packet size;

storing the packets in the buffer;

removing one or more of the packets from the buffer;

calculating an assumed available buffer size and an actual available buffer size, wherein both the assumed and actual available buffer sizes correspond to the buffer, and wherein the assumed available buffer size is calculated by subtracting the packet sizes of the stored packets from the buffer size, and the actual available buffer size is calculated by adding the packet sizes of the removed packets to the assumed available buffer space; and sending an acknowledgment to the sender in response to the assumed available buffer size falling below a limit, the acknowledgment including the actual available buffer size.

* * * * *